May 16, 1933.  W. LA HODNY  1,908,767
COMBINED MIRROR AND INSTRUMENT
Filed Nov. 13, 1931
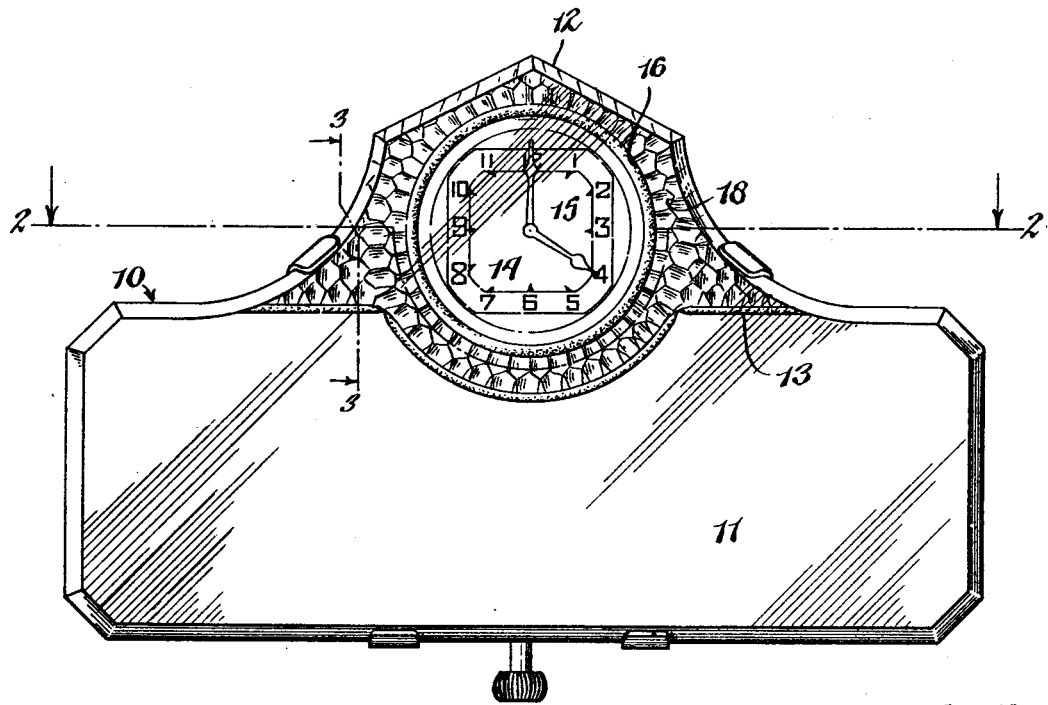
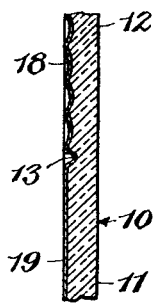
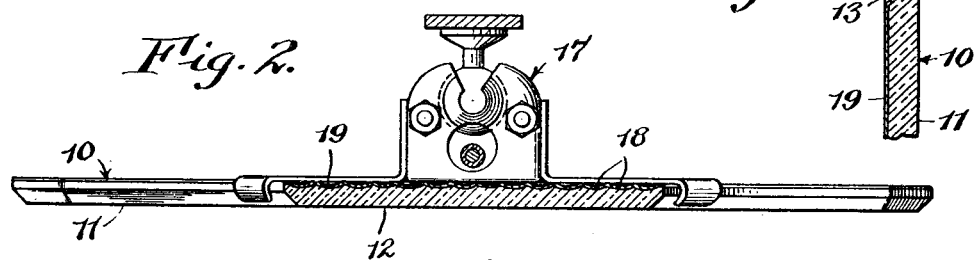
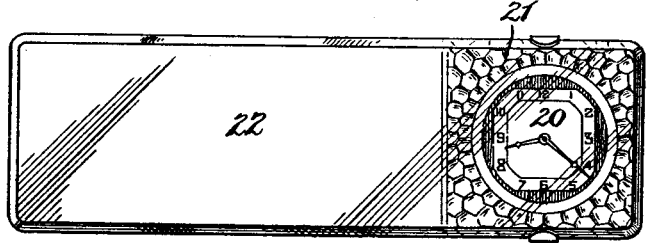
INVENTOR
William La Hodny
BY Popp and Powers
ATTORNEYS Patented May 16, 1933

1,908,767

UNITED STATES PATENT OFFICE

WILLIAM LA HODNY, OF BUFFALO, NEW YORK, ASSIGNOR TO STANDARD MIRROR COMPANY, INC., OF BUFFALO, NEW YORK, A CORPORATION OF NEW YORK

COMBINED MIRROR AND INSTRUMENT

Application filed November 13, 1931. Serial No. 574,739.

This invention relates to a combined mirror and instrument and more particularly to a mirror which is intended to give a rear view of the roadway behind the car from a point on the windshield and a time piece such as a watch or clock associated with this mirror, so that the driver of the car need only glance in one direction in order to observe the road conditions in rear of the car and also to ascertain the time of day. The invention, however, contemplates the use of other instruments in connection with such a mirror which are now commonly used on an automobile and are referred to from time to time by the driver, such as a compass, a barometer, a thermometer, an oil viscosity gage, or an instrument of any other character which the driver may wish to observe occasionally for obtaining some specific information. In mirrors of this character as heretofore constructed, the entire rear surface of the glass mirror plate or panel was usually covered with a reflecting material in such manner that an image would be reflected from any part of the same and the instrument, such as a watch or clock, mounted on the rear of this plate was visible from the front side thereof through a clear portion of the glass plate or panel. This construction is, however, objectionable inasmuch as the reading of the dial of the time piece was confusing due to the image-reflecting quality of that portion of the mirror which surrounded the time piece.

It is therefore the object of this invention to provide a combined mirror and instrument in which the instrument is mounted on the rear side of the glass plate and is visible from the front side thereof but only a part of the glass plate remote from the instrument is provided with an image-reflecting coating while the area of the glass plate immediately adjacent to the instrument and around the same is made of a non-image-reflecting material thereby producing a contrast between these fields or areas which enables the driver to readily view either the image-reflecting mirror portion or the instrument portion of the glass plate and make his observation without any confusion in the vision.

Another purpose is to provide but one type of coating material for the transparent panel which material in the field or area remote from the instrument is image-reflective, whereas in the field immediately adjacent the instrument is non-image-reflective. By this means the plating of the transparent panel can be effected in one coating operation thereby avoiding the expense of providing one type of material for one field or area of the transparent panel and another type of coating for the other field or area.

In the accompanying drawing:

Fig. 1 is a front elevation of a combined rear vision mirror and time piece made in accordance with my invention.

Fig. 2 is a section taken on line 2—2, Fig. 1.

Fig. 3 is a section taken on line 3—3, Fig. 1.

Fig. 4 is a modified form of the invention showing it applied to a rear vision mirror plate of rectangular form.

Referring to Figs. 1–3 the numeral 10 represents the transparent plate of the rear vision mirror which plate is preferably made of glass although any suitable transparent material will answer the purpose. This plate in this instance is composed of a lower image-reflecting portion 11 and a central portion 12 which rises above the lower image-reflecting portion 11. The invention can obviously be carried out in a wide variety of forms and designs and in the mirror shown a groove 13 is cut into the rear side of the transparent panel and divides the image-reflecting area or field 11 of the mirror from the upper non-image-reflecting portion 12.

The upper non-image-reflecting portion 12 is also formed to provide the crystal 14 for the hands and dial of a time piece 15. A groove 16 is cut into the rear side of the mirror plate 10 around this crystal and serves to differentiate the area forming the crystal 14 from the remaining non-image-reflecting portion 12 of the glass plate 10. The watch or clock 15 can be supported in the groove 16 in any suitable manner and as shown is held in place by a bracket indicated generally at 17, this bracket also forming the support for the mirror clock combination from the head bar of the windshield of an automobile (not shown). This mounting forms no part of the present invention and hence is not illustrated in detail. A mounting suitable for use in connection with the present invention is shown in my Patent No. 1,884,759, issued October 25, 1932.

Between the grooves 16 and 13, the glass plate 10 is so formed as to be non-image-reflective. For this purpose the rear side of this part of the transparent panel 10 is preferably roughened or indented so that regardless of what form of coating is placed upon the rear side of the panel this portion of the plate or panel cannot be image-reflective. By the term "roughened" as herein used, is meant a surface having inequalities in contradistinction to an unbroken or planar surface and by the term "non-image-reflecting" is meant a reflecting quality differing from that provided by an unbroken polished surface of substantial area, as an ordinary mirror. In the preferred manner of so roughening the rear side of the transparent panel 10 a series of indentations 18 are ground into the rear face of the transparent panel 10 in such manner that the indentations cover the entire surface of the panel between the grooves 16 and 13. These recesses or indentations 18 can be cut on an abrasive wheel by shifting the glass panel on the wheel until the entire surface between the grooves 16 and 13 is covered with the concave, rounded indentations 18. After the indentations 18 have been ground the entire rear face of the transparent panel 10 is provided with a reflective coating 19. This reflective coating can be of any suitable material but is preferably made of a material having low reflecting capacity, such as gold or the like, which materials are now commonly used in non-glare rear vision mirrors. In the lower portion 11 of the panel this coating, of course, provides an image-reflecting area since the rear part of this portion of the transparent panel is flat and uninterrupted. The portion of this coating which covers the indentations 18 and the grooves 13 and 16, however, is not image-reflective since this portion of the surface of the transparent panel is broken up by the indentations and grooves. A field of non-image-reflective coating is therefore provided between the opening or crystal 14 through which the face of the instrument is adapted to be displayed and the lower image-reflecting portion 11 of the panel 10.

It is apparent that the invention can be carried out with other forms of rear vision mirrors. In Fig. 4 is illustrated a rectangular mirror in which all but the crystal 20 is provided with the same reflective coating but in which the area 21 surrounding this crystal is indented so that when the reflective coating is applied the opposite end 22 of the panel is image-reflective whereas the area around the crystal 20 is non-image reflective.

It is obvious that the invention can be carried out in a large number of ways. For example, the removal of the reflective coating to provide the crystal 14 can be effected at the same time that the groove 16 is cut. Also the area forming this crystal 14 can be covered during the coating process thereby avoiding coating this area.

The present invention provides a combined mirror and instrument which is extremely attractive particularly in that the same material is used for both the non-image-reflecting portion and the image-reflecting portion of the mirror. A combined mirror and instrument so made, however, appears to be made of two tones of the same color since the indented non-image-reflecting portion 12 of the mirror is much darker than the image-reflecting portion 11 thereof. This is true because even though the same coating is used for both portions the reflecting efficiency of the indented portion of the mirror is much less than the image-reflecting portion thereof so that there is a distinct difference between the tone or shade of these two portions. In glancing at the instrument face there is no confusion by reason of a surrounding image-reflecting portion and the combined mirror and instrument is easily used in either of its capacities without confusion from that portion of the device which provides the other instrumentality. Since one coating is used to provide both the image-reflective and the non-image-reflective portion it is apparent that a saving in labor results. The pebbled or grained effect provided by the indentations 18 also provides a very pleasing effect which greatly enhances the beauty of the combination.

I claim as my invention:

1. A transparent panel having a portion through which the face of an instrument is adapted to be displayed, another portion of said panel having a smooth surface and a portion of the surface of said panel between said display portion and said smooth surface being roughened, and a uniform reflective coating applied to both said smooth and roughened surfaces, that part of said coating applied to said smooth surface being image-reflective and that part of said coating applied to said roughened surface imparting diffused reflecting qualities thereto whereby the face of the instrument is more easily discerned through said display portion.

2. A transparent panel having a portion through which the face of an instrument is adapted to be displayed, another portion of said panel having a smooth surface and a portion of the surface of said panel between said display portion and said smooth surface having a plurality of indentations therein and a uniform reflective coating applied to both said smooth and indented surfaces, that part of said coating applied to said smooth surface being image-reflective and that part of said coating applied to said indented surface imparting diffused reflecting qualities thereto whereby the face of the instrument is more easily discerned through said display portion.

3. A transparent panel having a portion through which the face of an instrument is adapted to be displayed, another portion of said panel having a smooth surface and a portion of the surface of said panel between said display portion and said smooth surface having a plurality of indentations ground therein and a uniform reflective coating applied to both said smooth and indented surfaces, that part of said coating applied to said smooth surface being image-reflective and that part of said coating applied to said indented surface imparting diffused reflecting qualities thereto whereby the face of the instrument is more easily discerned through said display portion.

4. The hereindescribed method of treating a smooth transparent panel having a portion through which the face of an instrument is adapted to be displayed, which comprises providing indentations on that portion of the smooth transparent panel adjacent said display portion and then coating the smooth and indented surface with a uniform layer of a reflective coating whereby the smooth face of said panel is image-reflective and the indented face of said panel has diffused reflecting qualities.

5. The hereindescribed method of treating a smooth transparent panel having a portion through which the face of an instrument is adapted to be displayed, which comprises grinding indentations on that portion of the smooth transparent panel adjacent said display portion and then coating the smooth and indented surface with a uniform layer of a reflective coating whereby the smooth face of said panel is image-reflective and the indented face of said panel has diffused reflecting qualities.

In testimony whereof I hereby affix my signature.

WILLIAM LA HODNY.